June 12, 1951     H. F. TEICHMANN     2,556,237
APPARATUS FOR THE PRODUCTION OF BLOWN GLASS ARTICLES
Filed Aug. 18, 1944     5 Sheets-Sheet 1
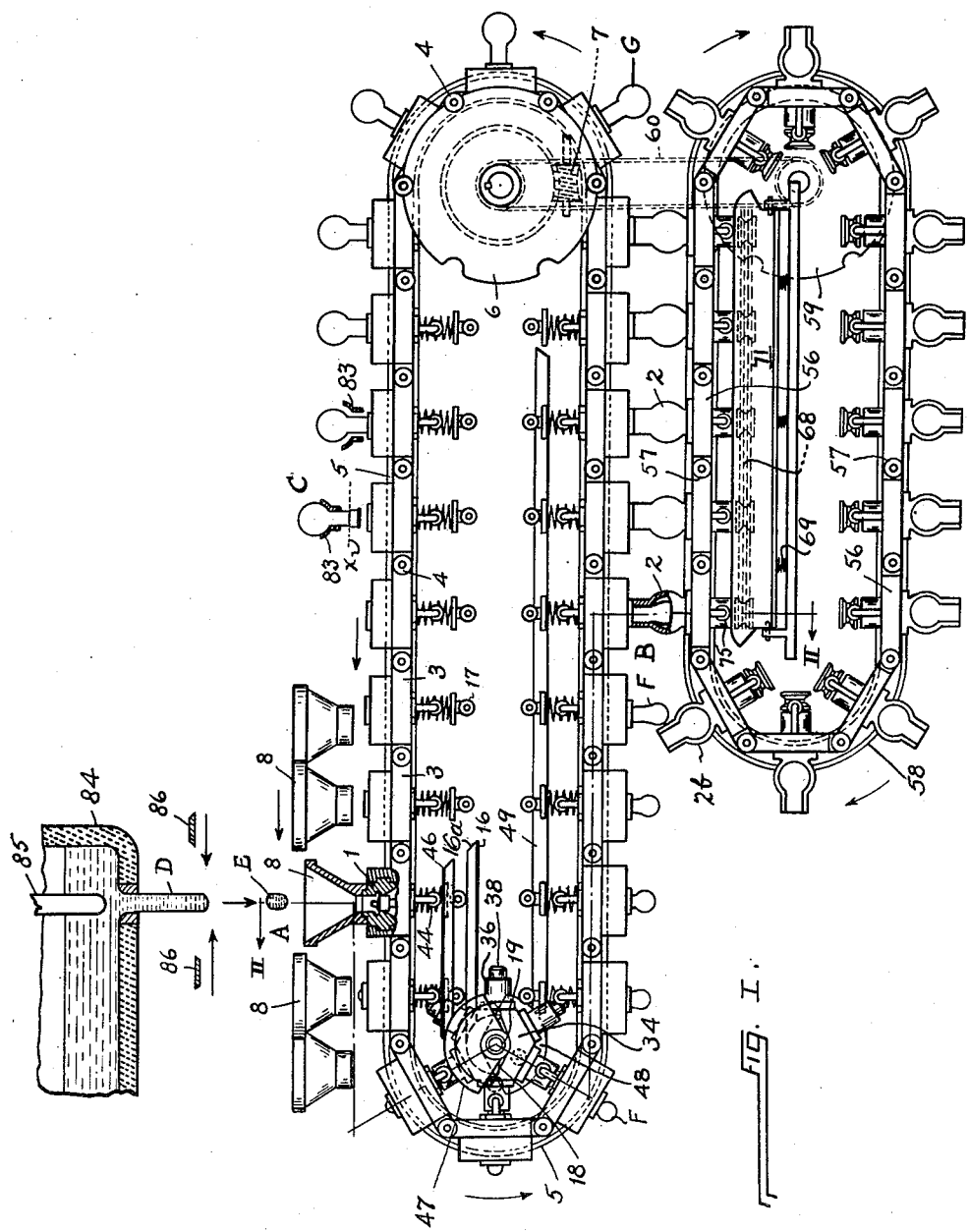
INVENTOR
Henry F. Teichmann
by Christy, Parmelee & Wharton
his attorneys June 12, 1951 H. F. TEICHMANN 2,556,237
APPARATUS FOR THE PRODUCTION OF BLOWN GLASS ARTICLES
Filed Aug. 18, 1944 5 Sheets-Sheet 2
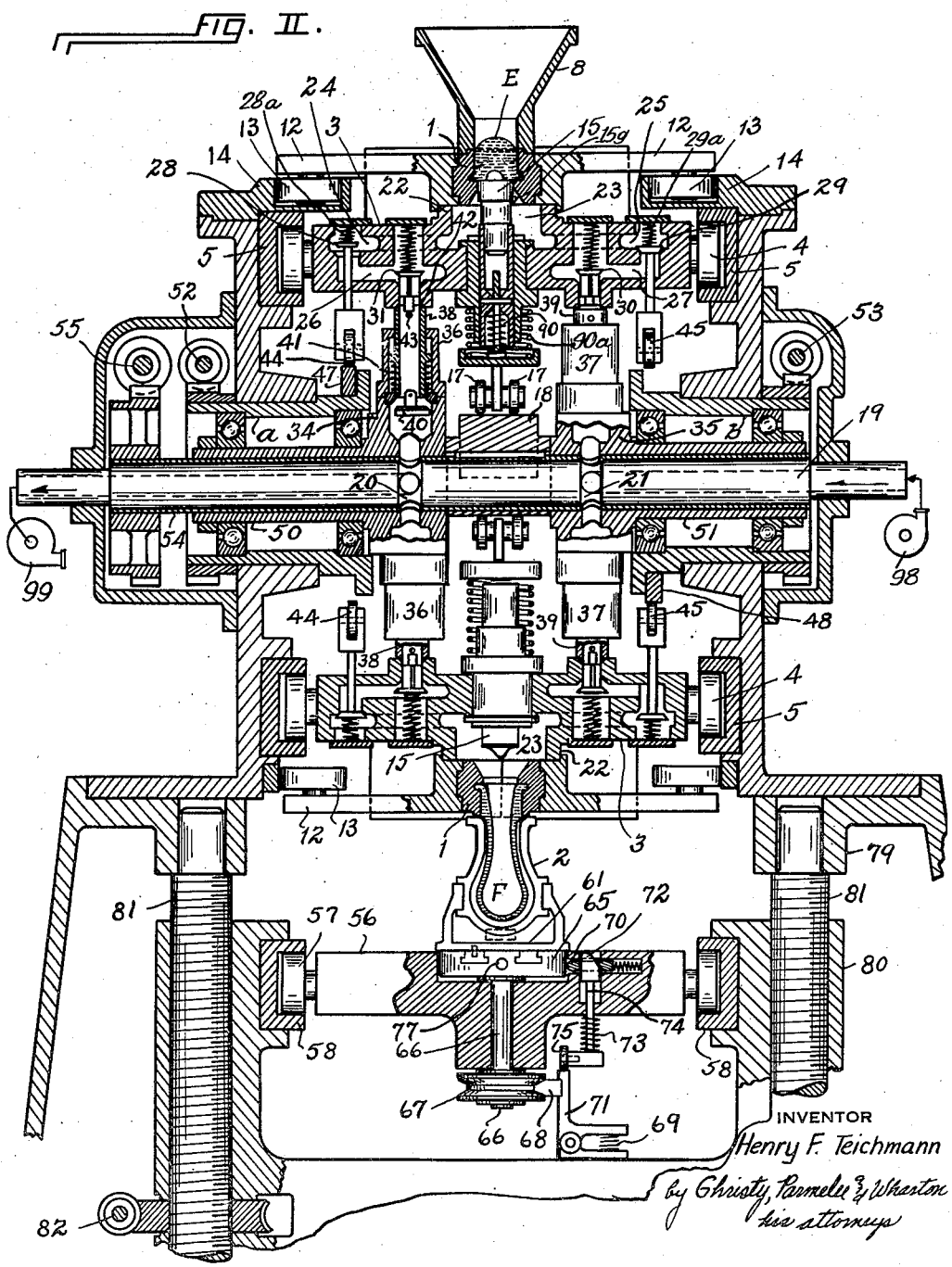
INVENTOR
Henry F. Teichmann
by Christy, Parmelee & Wharton
his attorneys

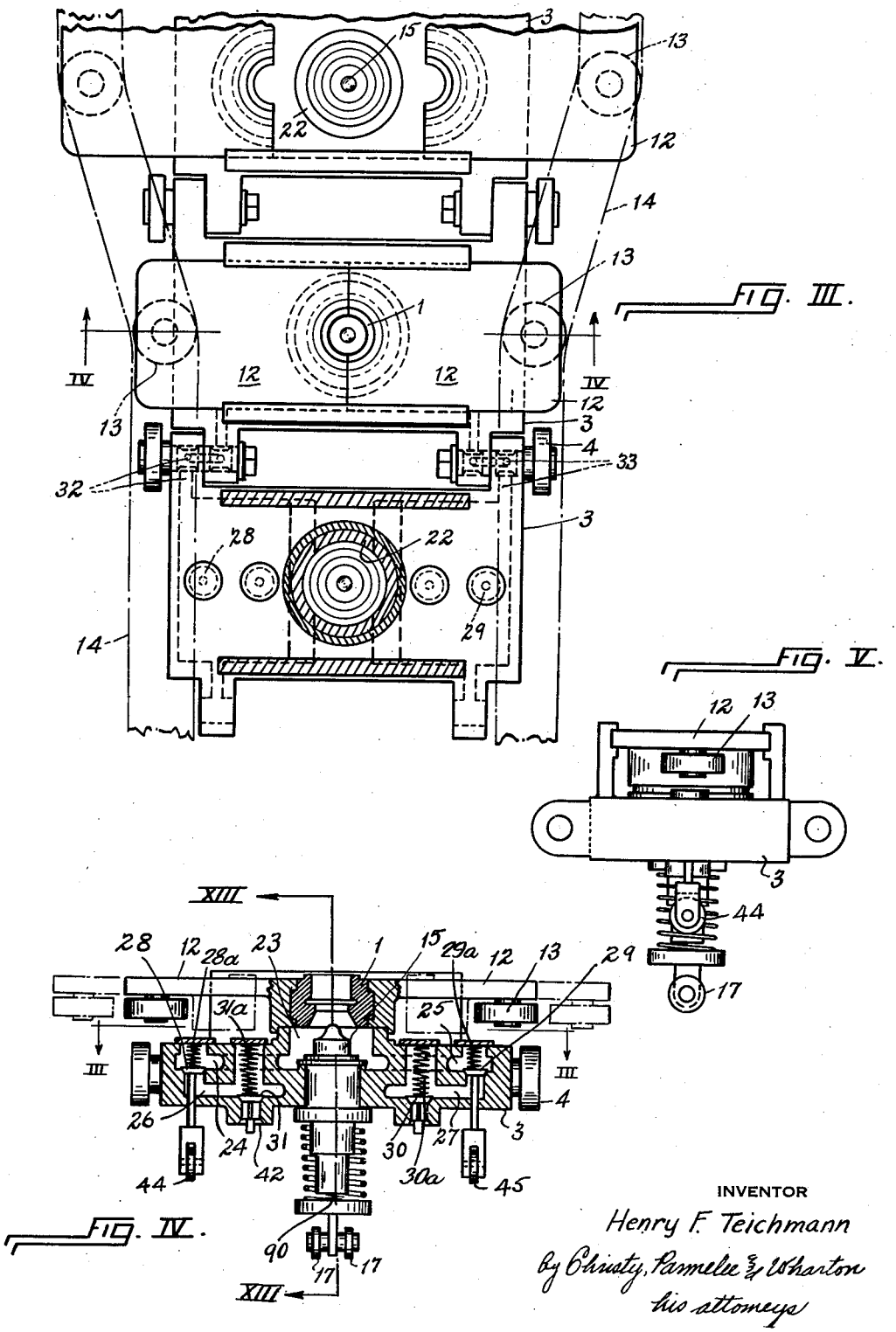

June 12, 1951 H. F. TEICHMANN 2,556,237
APPARATUS FOR THE PRODUCTION OF BLOWN GLASS ARTICLES
Filed Aug. 18, 1944 5 Sheets-Sheet 4
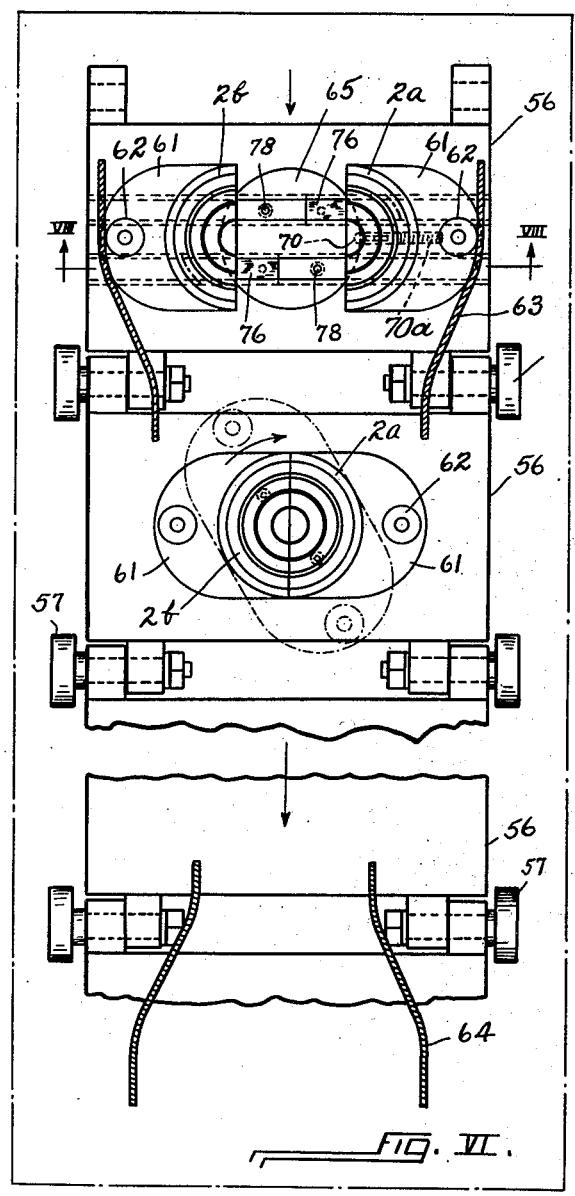
Fig. VI.
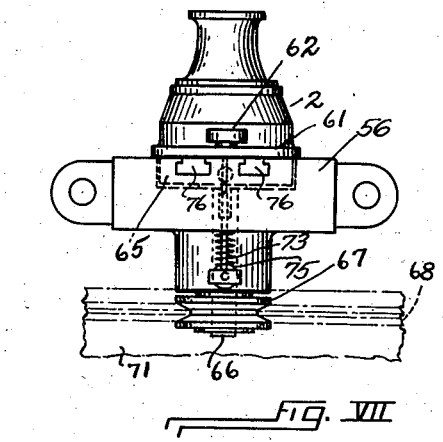
Fig. VII.
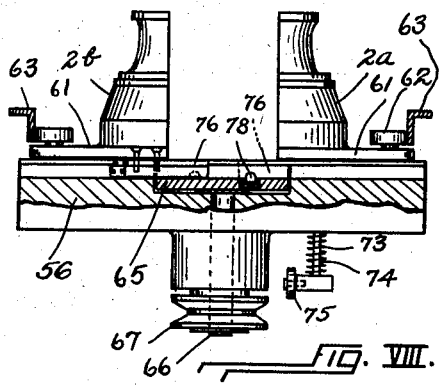
Fig. VIII.
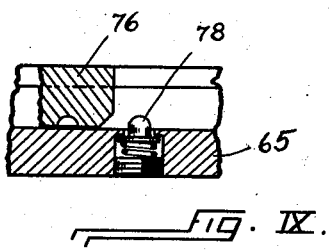
Fig. IX.
INVENTOR
Henry F. Teichmann
by Christy, Parmelee & Wharton
his attorneys

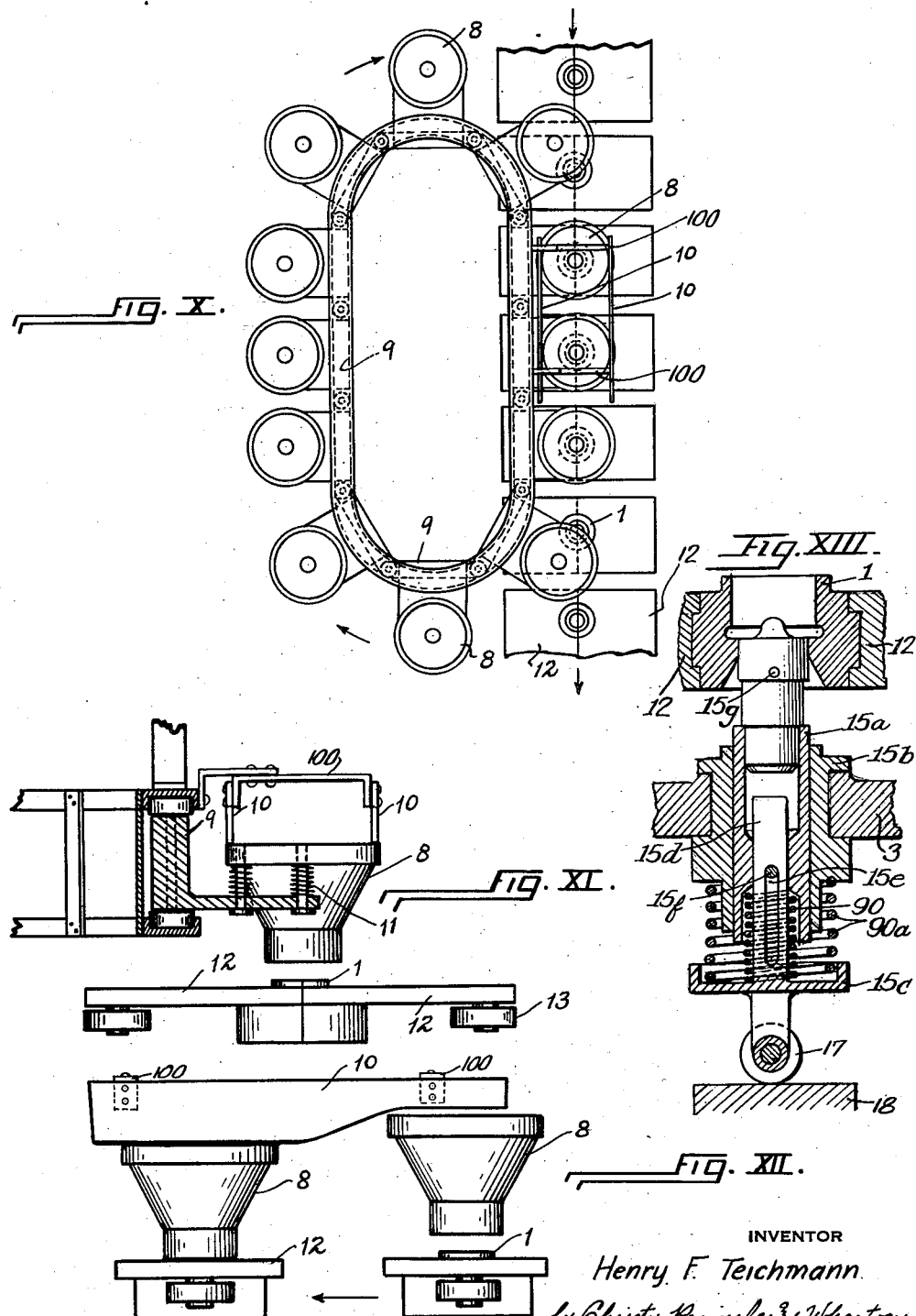

Patented June 12, 1951

2,556,237

UNITED STATES PATENT OFFICE 2,556,237

APPARATUS FOR THE PRODUCTION OF BLOWN-GLASS ARTICLES

Henry F. Teichmann, Washington, Pa., assignor, by mesne assignments, to Glafent Corporation, a corporation of Maryland Application August 18, 1944, Serial No. 550,000

5 Claims. (Cl. 49—5)

1

This invention relates to the production of blown glass articles, typically incandescent-lamp bulbs, and is found in apparatus. The objects in view are simplicity and economy in procedure and in apparatus, and superiority in quality of product.

In the accompanying drawings Fig. I is a view partly in side elevation, partly in section, and in some degree diagrammatic, of apparatus of the invention. Fig. II is a fragmentary view to larger scale of the apparatus of Fig. I, seen in transverse section and showing parts that do not appear in Fig. I. The plane of Fig. II is a broken plane, indicated by the lines II—II of Fig. I. Figs. III, IV, and V, illustrate, on like scale with Fig. II, a portion of the apparatus. Fig. III is a fragmentary view, partly in plan, partly in horizontal section of a mold-carrying chain of the apparatus; Fig. IV is a view of the same in vertical section; and Fig. V is a view in side elevation of one of the mold-carrying chain elements. The plane of section of Fig. III is, in Fig. IV, indicated at III—III; and the plane of section of Fig. IV is indicated at IV—IV, Fig. III. Fig. VI is a fragmentary view in plan of a second mold-carrying chain of the apparatus, with certain guides shown in horizontal section. Fig. VII is a view in side elevation of one of the mold-carrying elements of the second chain, with a certain rail element shown fragmentarily in broken lines. Fig. VIII is a view partly in elevation and partly in vertical section, on the plane indicated at VIII—VIII, Fig. VI. Fig. IX is a view to yet larger scale and in vertical section, of a detail of the structure of Figs. VI—VIII. Fig. X is a view in plan from above of a chain of funnel elements embodied in the apparatus fragmentarily shown in side elevation in Fig. I. Figs. XI and XII are views to larger scale than Figs. I and X, in vertical section and in side elevation, showing fragmentarily the structural organization of the chain of funnel elements in detail. And Fig. XIII is a fragmentary sectional view of a plunger unit of the apparatus, shown on the plane XIII—XIII of Fig. IV, and additionally illustrating a portion of a mold.

The apparatus includes a plurality of traveling molds severally formed of mold parts 1 and 2. The ring mold parts 1 severally receive (at A) successive gobs of plastic glass; and within them the glass is immediately shaped in part. The charged mold parts 1 then come successively (at B) to assembly with mold parts 2, to form completed molds, within which the shaping of the glass is brought to completion. The molds deliver (at C) successive finished articles.

A succession of plates 3, articulated as shown in Fig. III, is formed into an endless chain. The axles upon which the plates are articulated project laterally and carry rollers 4. A pair of stationary guideways 5 (cf. Fig. II), spaced apart transversely of the apparatus, and a pair of rotary sprocket wheels 6 mounted on a common axle and spaced apart (but one of them appears in Fig. I) receive the rollers 4, as shown in Fig. I. The chain extends in a vertical plane of travel with upper and lower horizontal reaches, interconnected by rounded courses at the ends. The sprocket wheels 6, suitably driven, as through worm gear 7 (Fig. I), cause the endless chain of plates 3 to advance in the counterclockwise direction indicated by arrows in Fig. I.

A plurality of travelling glass-gob-receiving and/or directing elements or funnels 8 (Figs. I and X) cooperate with the mold parts 1. These may be mounted on blocks 9 and the blocks articulated in an endless chain, and the chain is caused to travel in synchronism with the chain of mold parts 1. The mold parts 1 circulate in vertical plane; the funnels 8 in horizontal plane (in the direction indicated by arrows, Fig. X); and the arrangement is such (see Fig. I and compare Fig. X) that, as the mold parts borne by blocks 3 advance from right to left in the upper reach of the endless chain, and at a point to the left of point C, the funnels come (in clockwise course, Fig. X) to vertical alignment, one above each of the mold parts 1, and descend into engagement with such mold parts and continue in such engagement to a point to the left of point A (Fig. I). When that point has been reached the funnels rise from engagement with the mold parts 1, and recede again (right to left, Fig. X). Two bars 10 (Figs. X, XI and XII) are rigidly supported along the path of travel of the funnels by means of brackets 100 and these bars are such in shape and position that, as a funnel advances in vertical alignment with a mold part 1, its rim engages at diametrically opposite points the two bars 10 and it is shifted vertically downward and brought to engagement with the mold part 1. This is accomplished when the point A is reached. Such engagement of one of the funnels 8 with one of the mold parts 1 is shown in section in Fig. I. The funnels 8 are so carried in the blocks 9 as to permit of vertical movement, and springs 11 are provided, normally sustaining the funnels in elevated position, allowing the bars 10 to shift the funnels into engagement with the mold parts 1, and returning the funnels again to elevated position. Always at least one of the funnel elements is in engagement with one of the mold parts 1 on the driven chain of plates 3, and by such engagement the chain of funnels is caused to travel.

The mold parts 1 are compound and are formed each of two complementary semi-cylindrical portions. In the cycle of machine operation these portions close, to serve unitedly (at A, Fig. I) their essential mold function, and open again (at C), to release the finished article. The two portions of each mold part 1 are severally mounted upon slides 12 (Figs. II and III) that are borne in pairs, a pair upon each plate 3. The slides are mounted to move upon plates 3 in direction transverse to the line of advance of the plates. The slides are provided with vertically extending posts upon which rollers 13 are mounted. These rollers engage stationary guides 14; and the guides are such in position and shape that, as the plates advance in their course, the portions of the several molds parts 1, in ordered progress, close and open again. In Fig. III the contours of the mold-closing portions of the guides 14 are for clarity of illustration shown in outline.

Each plate 3 carries also a vertically reciprocable plunger 15. This plunger may be of various specific details of construction within the knowledge of the skilled artisan. Here the plunger is shown securely fixed in the upper end of a sleeve 15a vertically reciprocable in a bushing 15b in the body of the associate plate 3. The plunger assembly includes a member 15c that is equipped below (Fig. XIII) with rollers 17; that is provided above with a rigid plate-like stem 15d that is slotted as shown at 15e, and is vertically movable relatively to the sleeve 15a. A pin 15f extends transversely through the slot 15e and is secured at its opposite ends in the body of the sleeve 15a, and a compressed spring 90, bearing at its lower end on member 15c and at its upper end against the body of the sleeve 15a, normally keeps the sleeve 15a and member 15c separated to the extent permitted by the engagement of the pin 15f with the upper end of the slot 15e. Except when the plunger 15 is extended in position of operation, described below, a spring 90a biased between the bushing 15b and the member 15c serves to yieldingly retain the plunger 15 in retracted position, with a stop, here shown as a laterally extending pin 15g, in abutment upon the upper edge of the bushing 15b.

In the course of advance of the chain of mold-carrying plates 3, the rollers 17 of the plunger assembly of each plate engage the inclined end 16a (Fig. I) of a stationary rail 16 and by such engagement the member 15c is forced upward against the resistance of spring 90a. This upward thrust is transmitted through spring 90 to the sleeve 15a, and thus the sleeve and the plunger 15 carried thereby are yieldingly moved upward, and the upper end of the plunger caused to enter the space within closed mold parts 1, as shown in Figs. I and XIII. The plunger indeed itself becomes a mold member.

In Fig. II, in a plate 3 in the upper reach of the chain, a plunger 15 is shown in the projected position of cooperation with a mold part 1; and another plunger 15, in a plate in the lower reach of the chain, is shown in retracted position. The rail 16 is continued at its left-hand end (Fig. I) in a sector-shaped block or cam 18, and it will be seen that the surface upon which the rollers 17 of each spring-backed plunger bears, and by which the bearing is held in projected position, is parallel with the course of the advancing plate in which the plunger is carried.

Provision is made for establishing through the plate 3 and within the closed mold part 1, successively in the course of advance, conditions of suction and of pneumatic pressure. To such end a shaft 19, suitably mounted, extends transversely within the endless assembly of plates 3, and concentrically with the circularly curved left-hand end of the assembly, as seen in Fig. I. Shaft 19 is bored from opposite ends with bores that extend less than half way through the length of the shaft, and the two bores are severally in communication with two circumferential grooves 20 and 21 in the face of the shaft. These grooves in the assembly are arranged on opposite sides of the vertical mid-plane of the chain of molds (cf. Fig. II).

The two portions of the mold part 1 (or, more accurately speaking, the slides 12 that carry the mold parts) close upon a cylindrical boss 22 that rises from the plate 3. The parts are nicely machined, and the closure is substantially air-tight. The plunger 15 in its projection is, by proper proportioning of parts, caused to advance within but not hermetically to engage the adjacent mold surfaces: a clearance remains, providing pneumatic communication from the mold cavity above to a centrally arranged chamber 23 within plate 3 below. From chamber 23 passages 24 and 25 extend, to one side and the other; and from these lateral passages there is valve-controlled downward communication to lateral chambers 26 and 27. The valves 28 and 29 (Fig. IV) that control such communication close downwardly, and are raised against the tension of springs 28a and 29a respectively, exerted on their stems.

The bore to the right in shaft 19 (Fig. II) may be understood to be in communication with a source of compressed air, say an air compressor 98, and from this bore there is upward communication with chamber 27, through a check valve 30 held to its seat by a spring 30a (Fig. IV). The bore on the left within the shaft may be understood to be in communication with a vacuum pump 99 or other air-exhausting apparatus, and from chamber 26 there is downward communication with the last-mentioned bore, and the communication is controlled by a valve 31 that closes in the direction of flow under the stress of a spring 31a (Fig. IV).

Lines of communication (indicated at 32 and 33, Fig. III) extend through the pivotal unions between the plates 3, and all the suction chambers 26 throughout the series of plates are in communication, and all the pressure chambers 27 are also in communication. The lines of communication between the plates of the series may, alternately, be formed by means of flexible hoses, or the like, as shown in Letters Patent No. 2,329,146, granted to me September 7, 1943.

Lines of communication between the two series of chambers 26 and 27 in the successive plates 3 and the respective suction and pressure bores in shaft 19 are progressively and intermittently completed. The shaft 19 carries idly mounted upon it two interiorly chambered sleeves 34 and 35, whose several chambers are in free and constant communication with the two circumferential grooves 20 and 21 in the shaft. From the chambered sleeves 34 and 35 lead radial branches 36 and 37—as shown, six branches upon each sleeve. These branches severally carry telescopic nipples 38 and 39. Each nipple carries a valve 40, and a spring 41 is provided, whose tension normally holds the nipple extended and the valve seated. The spacing of the nipples corresponds to that of the mold parts 1.

As a plate 3 in the upper reach of the endless chain advances from right to left (Fig. I) and approaches the downwardly curved portion of its course, an orifice 42 in the nether face of the plate, engaging the outer end of a nipple 38, drives the nipple inward against spring tension, and in so doing unseats the valve 40. At the same time, abutment of the stem of check valve 31 with a pin 43 borne by the nipple operates to unseat the check valve; and, the stress of the nipple-urging spring 41 exceeding that of the backing spring of valve 31, the valve 31 is held open. Since both valves 40 and 31 are held open, the intercommunicating chambers 26 of the chain of plates 3 are brought into direct communication with air-exhausting apparatus. Such communication continues to be effective, so long as a plate continues in engagement with a nipple 38. Similarly, the nipples 39 of the sleeve 35 operate, to establish communication from the source of compressed air to the intercommunicating chambers 27 of the chain of plates or mold carriers 3.

The stems of the valves 28 and 29 are equipped with rollers 44 and 45, and, on one side of the machine, a rail 46 and a sector-shaped cam 47 are provided, and on the other side a sector-shaped cam 48 and a rail 49; and, by engagement with these, the valves 28 and 29 in the plates 3 are successively opened and held open as the plates advance. As the valve stems pass beyond such engagement the valves close under spring tension.

As has been said, throughout the series of plates 3, the suction chambers 26 are in communication; and similarly throughout the series the pressure chambers 27 are in communication; and, through the instrumentalities described, the suction chambers constantly are exhausted, and the pressure chambers constantly are supplied with air under pressure.

The sector-shaped cams 47 and 48 are mounted severally upon two sleeves $a$ and $b$, rotatable upon extensions 50 and 51 of the chambered sleeves 34 and 35 on shaft 19, and these sleeves $a$ and $b$ are adjustable circumferentially in their positions upon shaft 19 by worm adjusters 52 and 53. By such provision the point at which in the progress of the individual plate 3 the vacuum is cut off from and the point at which pressure is applied to the mold part 1 may be minutely adjusted. And by the provision of interchangeable bars or rails 46, 49 of various lengths, the points at which vacuum is applied and pressure cut off may be nicely determined. Already the sector-shaped block or cam 18 has been mentioned—the block or cam that serves to maintain the plunger 15 in projected position. This block is mounted upon a sleeve 54 that, underlying the others, surrounds shaft 19. A worm adjuster 55 is provided for rotating this sleeve and so adjusting with nicety the point in the progress of the plate at which the plunger is withdrawn from the mold part. The point at which the plunger is extended is determined by the length of the rail 16 and the relative position of its right-hand end (Fig. I).

Co-operating with the endless succession of plates 3 that carry the mold parts 1 is a second endless succession of plates 56 that carry severally the mold parts 2. The plates 56 are articulated to form a second endless chain. The axles upon which the plates 56 are articulated are also prolonged and carry rollers 57. The rollers travel in stationary guideways 58. The so supported endless chain extends in the same vertical plane of travel with the first, and in upper and lower horizontal reaches, inter-connected by rounded courses at the ends; and the upper horizontal reach of this second endless chain formed by the plates 56 is arranged immediately beneath and at a spaced interval from the lower horizontal reach of the chain formed by the plates 3. The lower chain is driven by sprocket wheels 59, and in synchronism with the upper chain, the plates of the lower chain advancing through the upper reach in the same direction with and in vertical alignment with the plates in the lower reach of the upper chain. This conveniently is accomplished by making the sprocket wheels 6 and 59 equal in size, and driving the axle of wheels 59 from the axle of wheels 6, as indicated at 60, Fig. I.

The mold parts 2 also are subdivided. Each consists of two portions, and in the cycle of machine operation these two portions close to serve unitedly their essential mold function, and open to release the finished article. The two portions of each mold part 2 (distinguished in Figs. VI and VIII as $2a$ and $2b$) are severally mounted upon or formed integrally with slides 61 that are borne in pairs, a pair upon each plate 56. The slides are mounted to move upon plates 56 in direction transverse to the line of advance of the plates. The slides are provided with vertically extending posts upon which rollers 62 are mounted. Stationary guides 63, 64 are set in pairs, adjacent and on the two sides of the path of advance of the endless chain of plates 56; and these guides are so placed and shaped that, as the chain travels, and at the proper and predetermined points in its path, the mold parts $2a$ and $2b$ in ordered progress close and open again.

Provision is made for the rotation of the mold part 2 while it continues in closed position. Each plate 56 carries centrally a rotatable table 65 provided with a central stem 66 that carries integrally a sheave 67. A rail 68 yieldingly held in active position by a spring 9 is mounted on a stationary support, and by engagement of the sheave 67 with the rail 68 the table 65 is rotated. A latch 70 backed by a spring 70a (Fig. VI) and entering a bore 77 (Fig. II) in the periphery of the table normally secures the table against rotation. The rail 68 is carried upon a beam 71 that is pivotally mounted upon the bed of the machine. This beam 71 (cf. Fig. II) forms the vertically extending arm of a bell-crank lever: the rail 68 is mounted in this vertical arm; the spring 69 bears upon the horizontal arm of the lever. A block 72 movable in a vertical slideway in plate 56 is provided with a wedge face that, when the block is driven powerfully upward, engaging latch 70, drives it against spring tension to unlatching and table-releasing position. The block is normally held in lowered and inactive position by a spring 73 that encircles a stem 74 upon which the block is carried. This stem 74 is equipped with a roller 75 that, engaging the track afforded by the upper edge of beam 71, effects the rise of block 72 against spring tension and the shifting of the latch 70 against spring tension to table-releasing position. The edge of the beam 71 is at its ends rounded off, as shown in Fig. I, to afford progressive rise and fall of the block 72.

Fig. VI, in its upper part, shows latch 70 in its extended position, securing the table 65 against rotation. The table is grooved with parallel grooves that, when the table is in latched position extend transversely of the block. The plate 56 also is grooved; and, when the table is in latched position, its grooves coincide with the grooves in plate 56, and form with them two continuous parallel grooves. Each slide 61 carries integrally secured to it a block 76; and the two blocks 76 slide, one in each of the two grooves. Each block is of such length as to guide the moving mold portion in right-line course; and the blocks are so proportioned that, when the mold portions are closed, these blocks 76 have passed from the grooves in the slide 56 and lie wholly within the grooves in the table 65. Spring-backed latches 78 secure the mold portions in closed position. These latches 78 suffice to hold the mold portions in closed position, so that the closed mold shall rotate in unison with the table; but the latches yield under stress; so that, when the plate 56 passes beyond the end of beam 71 (the right-hand end, Fig. I), and table 65 is arrested in its rotation and locked in inactive position, the rollers 62, engaging upon their outer faces the rails 64, will spread the mold portions again to open position.

The mouth of the mold part 2 is minutely shaped, to afford snug union with the mold part 1 when the pair of chain-borne mold parts meet, as shown below in Fig. II. The mold parts 2, as will be understood, are formed of such material and their inner surfaces (upon which the glass article is shaped) are of such character as the art knows, to serve the end in view.

In Fig. II it appears that the guideways 5, in which the upper endless chain travels, and the guideways 58, in which the lower endless chain travels, are severally mounted in frame parts 79 and 80; and that these frame parts are relatively adjustable in position, by means of screws 81, driven by worms 82. Thus the spacing of the chains may be minutely determined, to the end that the meeting of the mold parts shall be exact in vertical direction.

To the right (Fig. I) of the point where the mold part 1 is closed and brought to union with a funnel 8, the article is, by means of known tongs diagrammatically indicated at 83, raised free of the open mold and carried to an appropriate place of delivery.

The apparatus is arranged in suitable assembly with a glass tank or fore-hearth 84, and a delivery orifice, with a flow-controlling rod 85 adjustably positioned above it, is arranged to deliver freely and continuously under gravity a stream D of molten glass, in line directly above the series of mold parts 1.

A pair of shear blades 86 is mounted to reciprocate across the stream of glass D, and, in co-ordination with one another, to shear the descending column of glass into a succession of gobs. The shears are, by appropriate and known means, driven at appropriate speed in synchronism with sprocket wheels 6. See for example Letters Patent No. 2,357,702 granted on my application September 5, 1944.

In operation, the glass-feeding means deliver a succession of gobs E that fall one by one into a succession of receptacles formed by the closed molds 1 and the co-operating funnels 8 and plungers 15 (Figs. I and II). A condition of suction then existing in chamber 23 (Fig. II), the gob E is shaped in part, to form the mouth of the article that is in course of production. As the mold part 1 advances, the funnel 8 rises, the mold part itself descends, the condition of reduced pressure is changed and a condition of blowing pressure is established in chamber 23. Under such pressure (the glass being already anchored in the mold part 1 by the shaping of the mouth portion within it) the still plastic body of glass expands bubble-like, as indicated at F. Rounding the left-hand end (Fig. I) of the course of the upper chain, and advancing from left to right along the lower reach toward the point B, the two portions of the mold part 2 close upon the unfinished article F and come snugly to engagement with mold part 1 (cf. Fig. II, below). The closed mold part 2 is then set in rotation. Within the rotating mold part 2 the article is blown to full size. The valve 29 then closes. In ordered sequence thereafter, mold part 2 ceases to rotate, its two portions spread apart and the finished article G, as the mold part 1 advances to the rounded right-hand end (Fig. I) of the path of the upper chain, passes out of the open mold part 2 and is carried by the still closed mold part 1 to position C, where the portions of mold part 1 separate and the article is lifted free of the mold and carried to the appropriate place of delivery, such as the mouth of an annealing lehr.

Manifestly the article so formed may be a beaker, or other thin-walled vessel; or it may, as primarily I intend, be a bulb for an electric light, or a photo-electric cell, in initial state; and in such case it will be perceived that the mouth of the article—the first-formed part, formed in mold part 1—may have but temporary utility, in the course of glass-shaping. When the article is finished, this part will be cut away. The line of cleavage is indicated at $x$, Fig. I.

The application for this patent comprised a continuation-in-part of my abandoned application, Serial No. 361,716, filed October 18, 1940.

I claim:

1. Glass-shaping apparatus including two endless chains of mold elements, means for propelling the two chains in synchronism, the course of advance of one of said chains extending through a gob-delivering station, and the two chains being correlated in position, whereby in the course of chain travel the mold elements of one chain unite with the mold elements of the other chain to form a succession of complete molds, and a chain of funnels propelled in synchronism with said chains of mold elements through a course that is at said station coincident with the course of the mold elements that are propelled through the station, the advancing funnels registering severally with the mold elements advancing in succession to and through the said station, and means for temporarily uniting the funnels with such mold elements.

2. Glass-shaping apparatus including an endless chain of mold elements mounted for circulation in a vertical plane, means for propelling the chain and thereby advancing the mold elements in their course of circulation through a gob-delivering station, and an endless chain of funnels mounted for circulation in a horizontal plane in synchronism with the mold elements circulating in said vertical plane, the course of advance of the funnels coinciding at said station with the course of advance of the mold elements, and the advancing funnels registering severally with the mold elements advancing in succession to and through said station, and means for temporarily uniting the funnels with such mold elements.

3. Glass-shaping apparatus including a series of ring-molds having open matrices and means for advancing the ring-molds with their matrix openings directed upwardly through a gob-delivering station, a series of funnels arranged above said ring-molds for travel in synchronism therewith, said funnels having vertical passages, means for moving said funnels downwardly into engagement with the tops of said ring-molds and temporarily uniting the funnels severally with the ring-molds as they advance through said station, whereby the lower portion of the vertical passage of each funnel provides an upwardly directed extension of the matrix of the ring-mold with which it is temporarily united, and means for lifting the funnels upwardly from the ring-molds as they move away from said station.

4. In glass-blowing apparatus including a series of ring-molds having open matrices and means for advancing the ring-molds with their matrix openings directed upwardly through a gob-delivering station, said ring-molds being formed in halves mounted for movement between closed and spread positions, means for closing the halves of each mold as it advances to said gob-delivering station, means for producing a condition of suction in the matrix in each ring-mold as it advances through said station, means for thereafter exerting pneumatic pressure in each ring-mold for a glass-blowing period, and means for spreading said mold halves when said glass-blowing period has ended; the invention herein described which comprises a series of funnels arranged above said ring-molds for travel in synchronism with such molds as they advance through said gob-delivering station, each of said funnels having a vertical passage, means for severally uniting the funnels temporarily with the tops of said ring-molds as they enter and pass through said station, whereby the lower portion of the vertical passage of each funnel provides an upwardly directed extension of the matrix of the ring-mold with which it is assembled, and means for lifting the funnels upwardly from engagement with the ring-molds as they pass from said station.

5. In glass-blowing apparatus including a series of ring-molds having open matrices and means for advancing the ring-molds first with their matrix openings directed upwardly in a course of advance extending through a gob-delivering station, and then through a blowing station with said matrices in inverted position, said ring-molds being formed in halves mounted for movement between closed and spread positions, means for closing the halves of each mold as it advances to said gob-delivering station and for spreading the halves of each mold as it leaves said blowing station, means for producing a condition of suction in the matrix in each ring-mold as it advances through said gob-delivering station and means for thereafter exerting a glass-blowing pressure in each mold, a series of blow-molds mounted below said ring-molds for travel in synchronism therewith, whereby each ring-mold advancing from said gob-delivering station into inverted position is united with one of said blow-molds for travel in unison therewith while said glass-blowing pressure is exerted therein; the invention herein described which comprises a series of funnels arranged above said ring-molds for travel in synchronism with such molds as they advance through said gob-delivering station, each of said funnels having a vertical passage, means for severally uniting the funnels temporarily with the tops of said ring-molds as they enter and pass through said gob-delivering station, whereby the lower portion of the vertical passage of each funnel provides an upwardly directed extension of the matrix of the ring-mold with which it is temporarily united, and means for lifting the funnels upwardly from engagement with the ring-molds as they pass from said station and move into inverted position for union with said blow-molds.

HENRY F. TEICHMANN.

REFERENCES CITED

The following references are of record in the file of this patent:

UNITED STATES PATENTS

| Number | Name | Date |
|---|---|---|
| 1,015,537 | Blue | Jan. 23, 1912 |
| 1,325,388 | Wilzin | Dec. 16, 1919 |
| 1,393,118 | Hall | Oct. 11, 1921 |
| 1,416,725 | La France | May 23, 1922 |
| 1,531,559 | Lynch | Mar. 31, 1925 |
| 1,531,560 | Lynch | Mar. 31, 1925 |
| 1,653,477 | Soubier | Dec. 20, 1927 |
| 1,742,098 | Rankin | Dec. 31, 1929 |
| 2,076,502 | Moscini | Apr. 6, 1937 |
| 2,263,126 | Gray et al. | Nov. 18, 1941 |
| 2,271,004 | Gray | Jan. 27, 1942 |
| 2,388,876 | Smith | Nov. 13, 1945 |